No. 753,606. PATENTED MAR. 1, 1904.
G. A. McALLISTER.
MACHINE FOR FILLING VESSELS WITH FLUID MATERIAL.
APPLICATION FILED MAY 29, 1903.
NO MODEL. 3 SHEETS—SHEET 1.
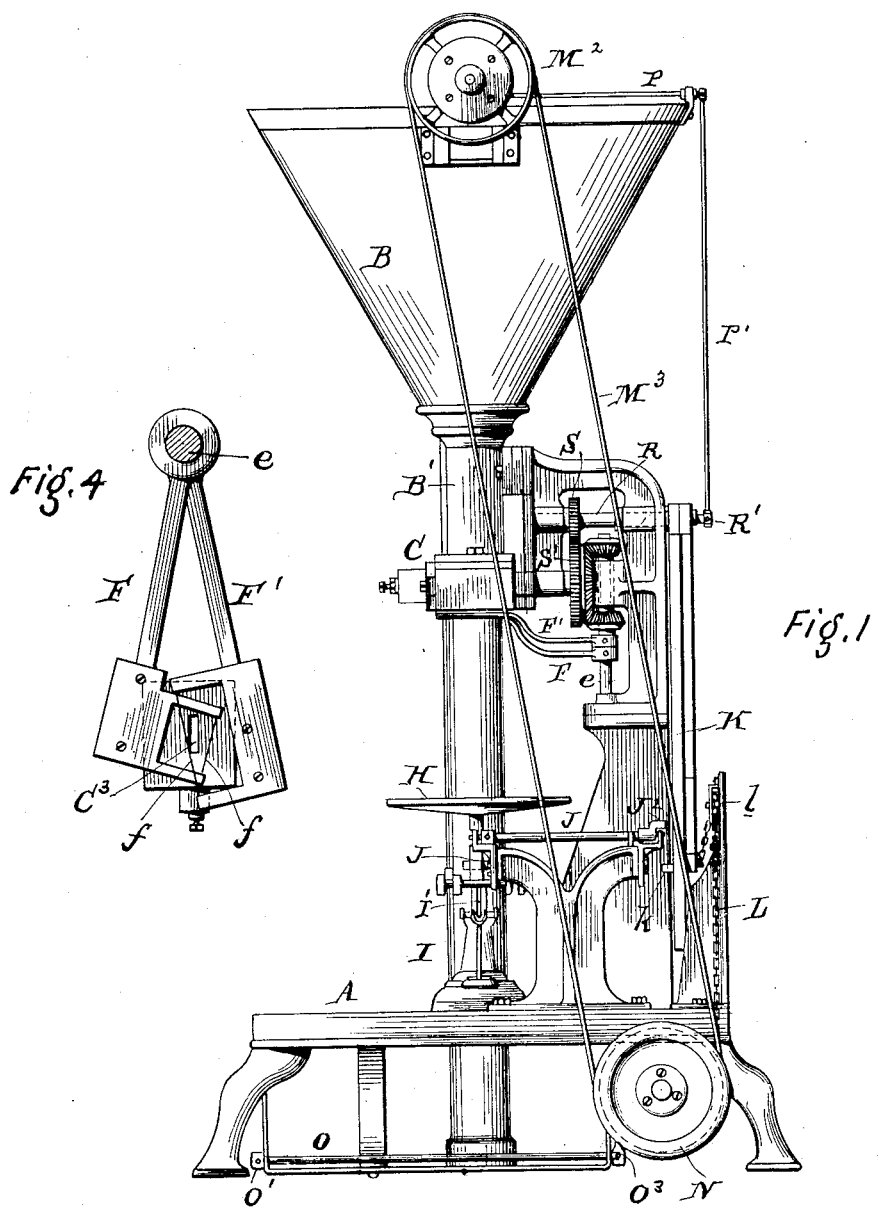
WITNESSES:
F. J. Hartman
R. M. Kelly
INVENTOR
Geo. A. McAllister
BY
ATTORNEY.

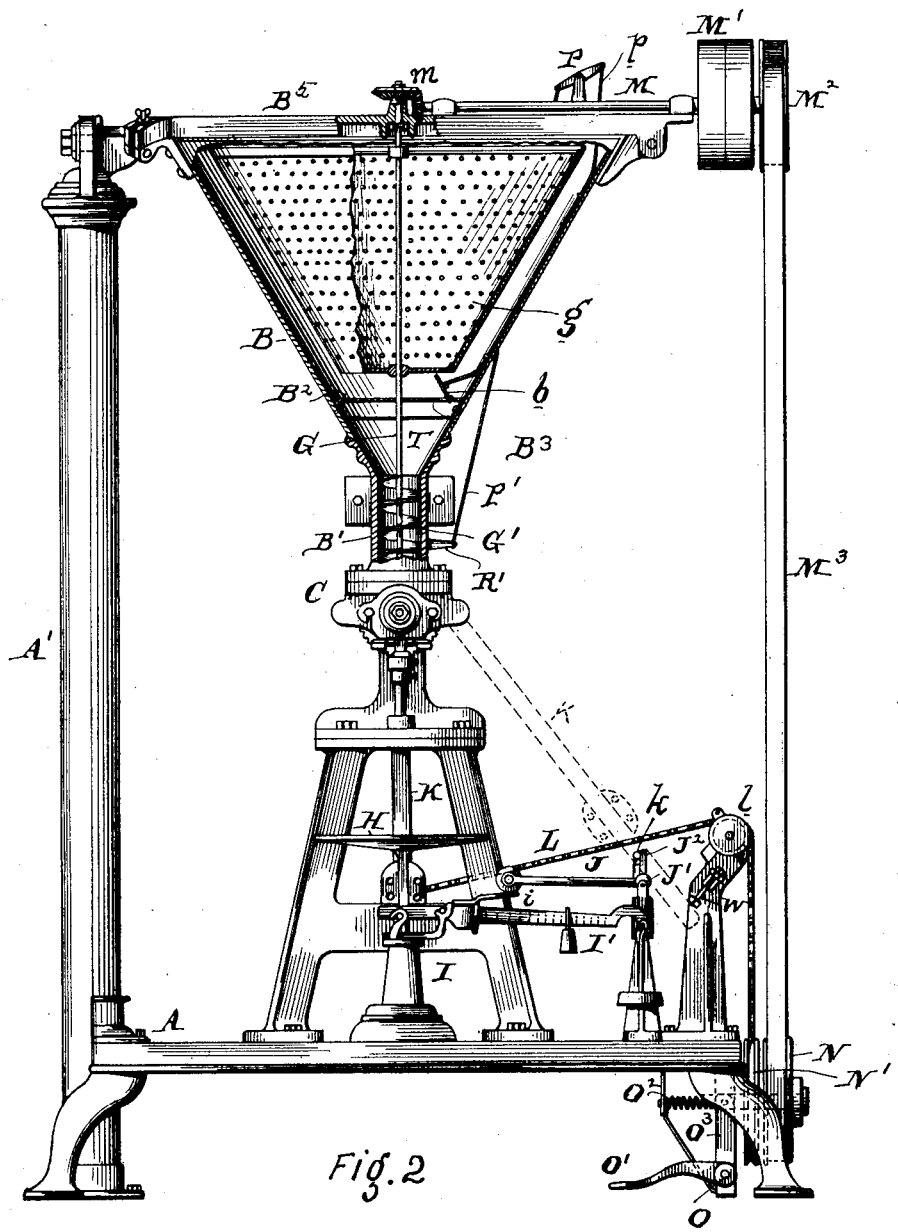

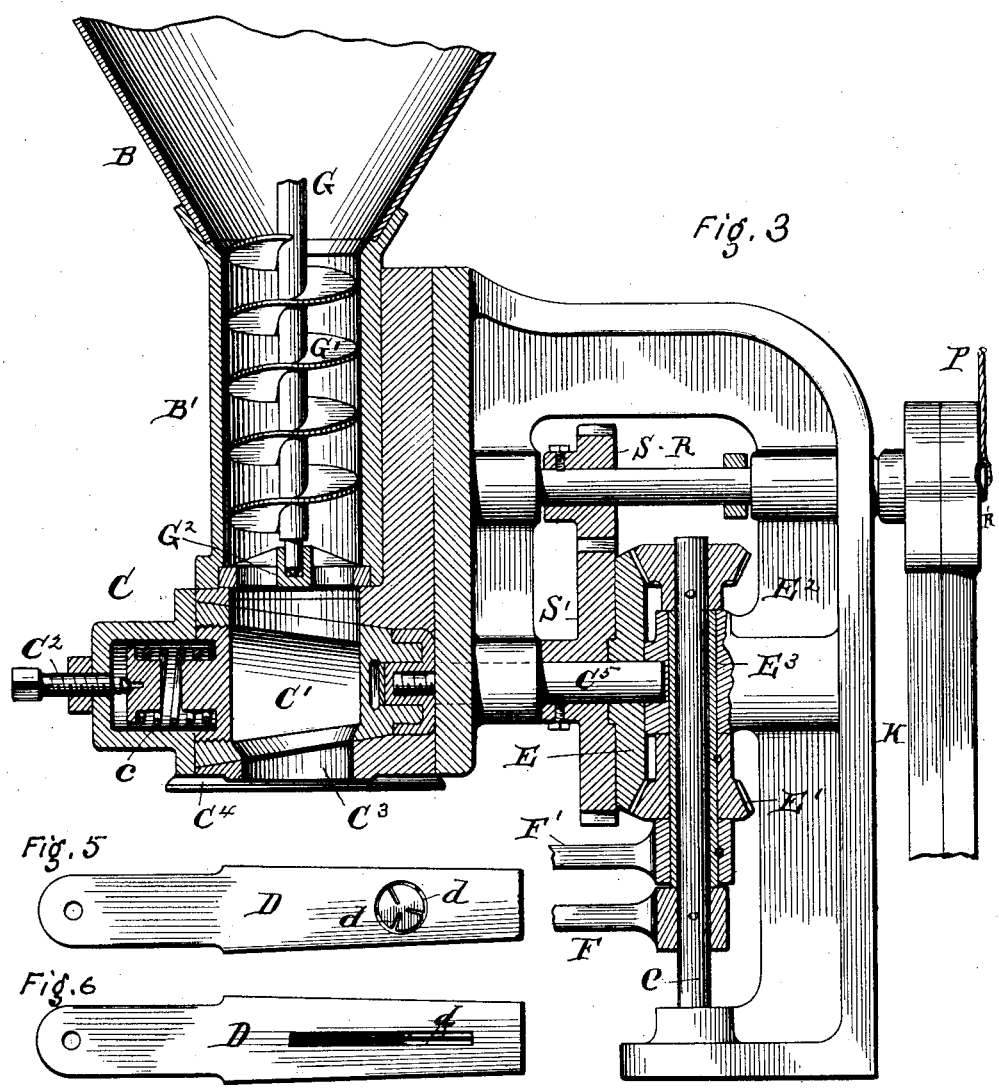

No. 753,606. Patented March 1, 1904.

UNITED STATES PATENT OFFICE.

GEORGE A. McALLISTER, OF GIBBSBORO, NEW JERSEY.

MACHINE FOR FILLING VESSELS WITH FLUID MATERIALS.

SPECIFICATION forming part of Letters Patent No. 753,606, dated March 1, 1904.

Application filed May 29, 1903. Serial No. 159,291. (No model.)

*To all whom it may concern:*

Be it known that I, GEORGE A. McALLISTER, of Gibbsboro, Camden county, State of New Jersey, have invented an Improvement in Machines for Filling Vessels with Fluid Materials, of which the following is a specification.

My invention has reference to machines for filling vessels with fluid materials; and it consists of certain improvements which are fully shown set forth in the following specification and in the accompanying drawings, which form a part thereof.

The object of my invention is to provide an organized apparatus adapted for filling cans or vessels with paint or other fluid materials in measuring an automatic manner, so far as the of the quantity thereof is concerned.

In carrying my invention into practice I employ the following features of construction:
A hopper terminating at the bottom in an automatic cut-off valve, in which the hopper is provided with an internal strainer, a transverse diaphragm below the strainer, and a valved passage-way through the diaphragm to retard the flow of the materials to the valve, and a valve to control the flow of the material combined with cut-off devices for severing the stream of paint, &c., to prevent continuous dripping when employed with or without a strainer-plate for subdividing the downward flow of material.

My invention also comprehends the above features when combined with a weighing device and connecting means under the control of the said weighing-machine for controlling the cut-off devices and operation of the valve, and, further, embodies other features of construction, which, together with the above set out, will be better understood by reference to the drawings, in which—

Figure 1 is a side elevation of a weighing and measuring machine embodying my invention. Fig. 2 is a front elevation of same with the hopper in section. Fig. 3 is a sectional elevation of the valve and cut-off. Fig. 4 is an inverted elevation of the cut-off devices for the valve, and Figs. 5 and 6 are plan views of valve-plates for subdividing the flow of fluid from the valve.

A is the main frame and is provided with a column or standard A', from which is supported a conical hopper B. This hopper is provided at the bottom with a tubular neck B', terminating in a valve mechanism C.

G is a vertical shaft arranged in the hopper and stepped in a bearing-plate $G^2$ at the bottom. It is provided with a retarding device G', preferably in the form of a screw located in the tubular neck B'. Secured to the upper part of the shaft G is a filter or screen $g$, which may be of metal or textile and in preferred form approximates the shape of the hopper B, as shown in Fig. 2. This shaft is rotated by gearing $m$, carried by a detachable frame $B^3$, which is hinged at one end to the hopper and clamped in position at the other end. This gearing $m$ is driven by a transverse shaft M, which is furnished with fast and loose pulleys M', by which it is operated through a belt (not shown) in the ordinary way.

The valve mechanism C comprises the valve-body fitted with the through-valve C' and having its lower orifice $C^3$ made elongated or slot-like in shape. The valve C' is held in its seat by a spring $c$, the tension of which is regulated by a screw $C^2$. This valve is rotated by a rock-shaft $C^5$, which receives its motion through gears S' S, rock-shaft R, and weighted arm K. The gear S' is secured to the rock-shaft $C^5$, and gear S and arm K are secured to the rock-shaft R, as shown in Fig. 3.

The weighted arm is pulled from a vertical position to the dotted position, Fig. 2, by a chain L, which is guided over pulley $l$ and friction-wheel N', the latter being normally free to rotate upon its axis. An adjustable stop W limits the movement of the arm K.

A friction-wheel N, concentric to wheel N', is driven by a belt $M^3$ and pulley $M^2$ on the shaft M, so that the wheel N is continually rotating when the machine is in operation. When it is desired to pull the arm K into the dotted position, Fig. 2, the pressure of the foot is applied to the treadle O', causing the rock-shaft O and arm $O^3$ to be rocked against the action of a spring $O^2$ and forcing the rotating friction-wheel N against the friction-wheel N', in which case the latter is rotated, so as to wind up the chain L and pull over the weighted arm K. When pulled over, this arm K is locked in such position by a latch $J^2$, receiving a pin $k$ on the arm.

H is a platform of scales I for supporting the can and weighing its contents while being filled. This platform H is arranged conveniently below the orifice $C^3$ of the valve device, and the scales as a whole are supported upon the table or frame A.

$I'$ is the scale-beam. These scales or weighing device may be of any construction found suitable.

J is an arm secured to a rock-shaft $J'$, carrying also the latch $J^2$. The free end of the arm J rests upon a support $i$, carried by the scale-beam $I'$. When in the position shown, the weight of the arm J insures the latch supporting the pin $k$. If a can be placed upon the platform H and be filled with paint or other material, so as to depress the platform and rock the scale-beam, then the support $i$ is raised and the shaft $J'$ rocked. The result of this is to press back the latch $J^2$ and free the pin $k$. The arm K would then drop to a vertical position by gravity and the valve $C'$ be rocked to shut off the flow of paint or other material from the hopper.

From the above description it will be seen that the opening of the valve $C'$ is under the control of the foot-treadle; but the closing is automatic and controlled by the weight of material delivered into the can.

To insure the paint or fluid substance being subdivided after it leaves the valve, I provide removable dividing-plates D, adapted to slide in guide-grooves $C^4$ on the valve-body and so as to be held tightly against the under side of the valve-body and its orifice. These plates D are formed with slots or apertures $d$ for controlling the flow or subdividing the material into two or more streams. The shapes of the slots or apertures may be varied to suit the requirements of the shape or form of the mouth of the can or vessel to be filled. In Fig. 5 they are shown more or less circular or curved, whereas in Fig. 6 the slot $d$ is shown very narrow and long. By the use of these plates the body of the material is thinned, so as to be easily controlled when being cut off and when the can is filled. It prevents excessive downward suction upon the material in the valve-orifice $C^3$ below the valve, and consequently insures the cessation of the flow just as soon as the mechanism closes the valve $C'$. These plates D are replaceable, so that the size and shape of the slot or slots or other apertures $d$ may be used to suit the particular material to be handled, since some materials are much thicker or more viscous than others. Also the size and the shape of the orifice in the can or vessel will have a governing influence upon the character of the slots or apertures $d$ to be used.

I have found in practice that the height of the column of material within the hopper and above the valve exerts a decidedly modifying influence upon the flow of the material through the valve and that the best results are secured in my machine when I provide retarding devices to retard the downward flow of the fluid. A retarding influence is secured by the use of the screw $G'$ or other equivalent obstruction within the neck and secured to the shaft G; but for best results, and especially with the more fluid substances, I provide a diaphragm $B^2$, having an orifice $B^3$, provided with a pivoted door or gate $b$. This diaphragm is below the screen and above the neck $B'$, as shown in Fig. 2. The valve $b$ is opened or closed by a rod $p$, extending upward and hinged to one arm of the lever P, the other arm of said lever being connected by a rod $P'$, leading to a crank-arm $R'$, carried on the end of the rock-shaft R, as shown in Figs. 1 and 2. When the rock-shaft is in the positions shown in Figs. 1 and 2, with the valve $C'$ closed, then the valve $b$ is open, and when the valve $C'$ is opened by moving the arm K to the dotted position in Fig. 2 and as shown in Fig. 3, then the valve $b$ is closed or substantially closed to prevent undue influence upon the fluid passing through the valve by the fluid above the diaphragm $B^2$. The space T, between the diaphragm $B^2$ and valve $C'$, constitutes a chamber into which the fluid passes through valve $b$ and from which it passes by valve $C'$.

Arranged below the valve-body and orifice $C^3$ and so as to work close to the under side of the plates D are cut-off wires $f f$, said wires being carried on frames F $F'$, pivoted on a common axis of rotation, but adapted to simultaneously reciprocate in opposite directions. The frame F is secured to an upright shaft $e$, and frame $F'$ is secured to the tubular shaft $E^3$, surrounding the shaft $e$. A pinion $E'$ is secured to shaft $E^3$, and a pinion $E^2$ is secured to shaft $e$. These pinions mesh with the teeth of a bevel-gear E on diametrically opposite diameters, so that the frames F are caused to rock simultaneously in opposite directions to the frame $F'$, as will be readily understood by reference to Figs. 1 and 3. The gear E is secured upon and has a rotary reciprocating motion with the valve-operating shaft $C^5$ and spur-wheel $S'$.

It is evident that the means for imparting movement to the cut-off frames F $F'$ may be made in other ways, so long as it secures the required movements to the frames and wires at the proper time—that is to say, to cause the wires to cut across the descending fluid stream from opposite sides when the valve $C'$ closes. The frames F $F'$ are V-shaped, with the wire stretched across the ends of the arms, as shown in Fig. 4, so that only the wires come in contact with the fluid material.

While I prefer the construction shown, the details thereof may be modified without departing from the spirit of the invention.

Having now described my invention, what I claim as new, and desire to secure by Letters Patent, is—

1. In a machine for filling vessels with fluid substances, the combination of a hopper, a valve at the bottom for intermittently controlling the flow of fluid therefrom, a diaphragm across the hopper above the valve, a valve in said diaphragm, and means for closing the valve in diaphragm when opening the valve at the bottom of the hopper and vice versa whereby the downward flow of fluid material is retarded to substantially the same degree irrespective of the height of the fluid within the hopper.

2. In a machine for filling vessels with fluid substances, the combination of a hopper, a valve at the bottom for intermittently controlling the flow of fluid therefrom, a diaphragm across the hopper above the valve, a valve in said diaphragm, a weighing device arranged below the hopper and its valve to support the vessel into which the fluid is to be fed, means for closing the valve in diaphragm when opening the valve at the bottom of the hopper, and means controlled by the weighing device for causing the valve of the hopper to be closed and the diaphragm-valve opened whereby the downward flow of fluid material is retarded to substantially the same degree irrespective of the height of the fluid within the hopper.

3. In a machine for filling vessels with fluid substances, the combination of a liquid-tight hopper, a chamber formed at the bottom of the hopper, a valve to control the flow of liquid from the hopper into the chamber, a discharge-valve to control the flow of liquid from the chamber, an agitator in the chamber above the discharge-valve, and means for closing and opening the two valves alternately.

4. In a machine for filling vessels with fluid substances, the combination of a liquid-tight hopper, a chamber formed at the bottom of the hopper, a valve to control the flow of fluid from the hopper into the chamber, a valve to control the flow of fluid from the chamber, means for closing and opening the two valves alternately, and a weighing device for holding the vessel to be filled adapted to automatically control the means for closing the valve which controls the flow of fluid from the chamber and opening the valve which controls the flow of fluid from the hopper to the chamber.

5. In a machine for filling vessels with fluid substances, the combination of a hopper, a valve at the bottom of the hopper to control the escape of fluid, a vertical rotating shaft within the hopper, a screen carried by and rotating with the shaft and automatic means controlled by the weight of the fluid discharged to operate the valve to cut off the fluid.

6. In a machine for filling vessels with fluid substances, the combination of a hopper having a neck at the bottom, a valve at the bottom of the neck of the hopper to completely close the neck or open it to control the escape of fluid, a vertical rotating shaft within the hopper having a screw arranged within the neck, and a screen carried by and rotating with the shaft.

7. In a machine for filling vessels with fluid substances, the combination of a hopper, a valve at the bottom of the hopper to control the escape of fluid, a vertical rotating shaft within the hopper, a screen carried by and rotating with the shaft, a diaphragm surrounding the shaft and across the hopper, and a valve in the diaphragm adapted to control the fluid passing from the screen to the valve at the bottom of the hopper.

8. In a machine for filling vessels with fluid substances, the combination of a hopper, a valve to control the flow of the fluid from the hopper, and a removable plate arranged against the discharge-orifice of the valve and having a slot or aperture structure for subdividing the fluid stream passing from the valve-orifice.

9. In a machine for filling vessels with fluid substances, the combination of a hopper, a valve to control the flow of fluid from the hopper, and a transversely-movable cut-off wire adapted to cut across the stream of fluid material close to the valve.

10. In a machine for filling vessels with fluid substances, the combination of a hopper, a valve to control the flow of fluid from the hopper, a transversely-movable cut-off wire adapted to cut across the stream of fluid material close to the valve, and means for simultaneously closing the valve and moving the wire across the fluid and vice versa.

11. In a machine for filling vessels with fluid substances, the combination of a hopper, a valve to control the entire flow of fluid from the hopper, a weighted arm to close the valve, a mechanical power device to raise the arm and open the valve, means independent of the valve to control the power device, a latch for holding the arm in its raised position, and a movable support for the vessel to be filled for operating the latch to release the arm when the vessel has been filled and its weight depresses the support.

12. In a machine for filling vessels with fluid substances, the combination of a hopper, a valve to control the flow of fluid from the hopper, a weighted arm to close the valve, a friction and chain device to raise the arm and open the valve, means to control the friction device, a latch for holding the arm in its raised position, and a movable support for the vessel to be filled for operating the latch to release the arm when the vessel has been filled and its weight depresses the support.

13. In a machine for filling vessels with fluid substances, the combination of a hopper, a valve to control the flow of the fluid from the hopper, two oppositely-moving cut-off devices adapted to pass across the stream of fluid from the valve, and means for simultaneously operating the valve and cut-off devices.

14. In a machine for filling vessels with fluid substances, the combination of a hopper, a valve to control the flow of the fluid from the hopper, two oppositely-moving cut-off devices adapted to pass across the stream of fluid passing from the valve, a movable support for the vessel adapted to be depressed by the weight of the fluid in the vessel, and means for simultaneously operating the valve and cut-off devices controlled by the movable support.

In testimony of which invention I hereunto set my hand.

GEORGE A. McALLISTER.

Witnesses:
CHARLES S. KING,
LOUIS F. BODINE.